(12) United States Patent
Cheng

(10) Patent No.: US 8,654,275 B2
(45) Date of Patent: Feb. 18, 2014

(54) LIQUID CRYSTAL DISPLAY DEVICE

(75) Inventor: Jiahe Cheng, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 223 days.

(21) Appl. No.: 13/381,056

(22) PCT Filed: Nov. 18, 2011

(86) PCT No.: PCT/CN2011/082458
§ 371 (c)(1),
(2), (4) Date: Dec. 27, 2011

(87) PCT Pub. No.: WO2013/060056
PCT Pub. Date: May 2, 2013

(65) Prior Publication Data
US 2013/0107159 A1   May 2, 2013

(51) Int. Cl.
*G02F 1/1333* (2006.01)
*H05K 5/00* (2006.01)
*H05K 7/00* (2006.01)

(52) U.S. Cl.
USPC ... 349/58; 348/794; 361/679.21; 361/679.22; 248/919; 345/905

(58) Field of Classification Search
USPC ........... 349/58; 361/679.21, 679.22; 248/919; 345/905
See application file for complete search history.

(56) References Cited

U.S. PATENT DOCUMENTS

| | | | |
|---|---|---|---|
| 6,504,707 B2 * | 1/2003 | Agata et al. | 361/679.05 |
| 7,063,295 B2 * | 6/2006 | Kwon | 248/276.1 |
| 2003/0080949 A1 * | 5/2003 | Ditzik | 345/173 |
| 2006/0244700 A1 * | 11/2006 | Sano et al. | 345/87 |

\* cited by examiner

*Primary Examiner* — Nathanael R Briggs

(57) ABSTRACT

Disclosed is a liquid crystal display device, which includes a base, a supporting part, and a liquid crystal display. The supporting part is fixedly connected with the liquid crystal display. A sliding hole along a horizontal direction is defined at the supporting part. The device further includes a first and second posts for supporting the liquid crystal display. The first post includes a first sliding end and a first connecting end, and the second post includes a second sliding end and a second connecting end. The first and second sliding ends slide to connect with the sliding hole. The first and second posts are screw-connected by the first connecting end and the second connecting end and screw-connected with the base. The first and second posts control a distance between the liquid crystal display and the base by rotating inwardly or outwardly.

18 Claims, 4 Drawing Sheets

LIQUID CRYSTAL DISPLAY DEVICE

BACKGROUND OF THE INVENTION

1. Field of the Invention

The present invention generally relates to a liquid crystal display technology field, and more particularly to a liquid crystal display device.

2. Description of Prior Art

With the progressive development of liquid crystal display technology, user requirements for functions of a liquid crystal display are getting higher and higher.

Please refer to FIG. 1. FIG. 1 shows a supporting method of a liquid crystal display in the prior arts.

A base 10' is fixedly connected with a supporting part 20' of a liquid crystal display 30'. Once a distance between the liquid crystal display 30' and the base 10' is fixed by users, a height of the liquid crystal display 30' is fixed. When the height of the liquid crystal display 30' is required to be adjusted, the base 10' and the supporting part 20' have to be disassembled. The disassembly processes are complicated. Accordingly, viewing effect of the users is affected, and experience feeling of the users is decreased.

In conclusion, one research direction of the liquid crystal display technology field is how to solve a technical problem that the users cannot flexibly adjust the height of the liquid crystal display for satisfying different viewing angels required by different heights of users in the prior arts.

SUMMARY OF THE INVENTION

An objective of the present invention is to provide a liquid crystal display device to solve the technical problem that the users cannot flexibly adjust the height of the liquid crystal display device since the supporting part and of the liquid crystal display device is fixedly connected with the base in the prior arts.

To solve the above-mentioned problem, the present invention provides a liquid crystal display device, which comprises a base, a supporting part, and a liquid crystal display. The supporting part is fixedly connected with the liquid crystal display. A sliding hole along a horizontal direction is defined at the supporting part. The sliding hole comprises a first sliding hole and a second sliding hole which are disposed apart.

The liquid crystal display device further comprises a first post and a second post. The first post and the second post are utilized for supporting the liquid crystal display. The first post comprises a first sliding end and a first connecting end, and the second post comprises a second sliding end and a second connecting end.

The first sliding end comprises a first through hole, and the second sliding end comprises a second through hole. The first sliding end slides to connect with the first sliding hole by the first through hole, and the second sliding end slides to connect with the second sliding hole by the second through hole.

The first connecting end comprises a first connecting hole, and the second connecting end comprises a second connecting hole. The liquid crystal display device further comprises a connecting post. The first connecting hole and the second connecting hole are connected by the connecting post, so that the first post and the second post are screw-connected, and the first post and the second post are further screw-connected with the base.

The first post and the second post control a distance between the liquid crystal display and the base by rotating inwardly or outwardly.

In the liquid crystal display device of the present invention, a gear structure is disposed at an inner side of the first sliding hole.

The liquid crystal display device further comprises a first knob. The first knob comprises a first screw post, a first screw nut, a first helical gear, and a first controlling button which are connected. The first screw post passes through the first through hole and the first sliding hole and is screwed to the first screw nut.

The first helical gear is adaptive to be connected with the gear structure at the inner side of the first sliding hole. The first controlling button is utilized for controlling the first screw post and the first helical gear to move along the horizontal direction, so as to control the first sliding end to slide relative to the first sliding hole.

In the liquid crystal display device of the present invention, a gear structure is disposed at an inner side of the second sliding hole.

The liquid crystal display device further comprises a second knob. The second knob comprises a second screw post, a second screw nut, a second helical gear, and a second controlling button. The second screw post passes through the second through hole and the second sliding hole and is screwed to the second screw nut.

The second helical gear is adaptive to be connected with the gear structure at the inner side of the second sliding hole. The second controlling button is utilized for controlling the second screw post and the second helical gear to move along the horizontal direction, so as to control the second sliding end to slide relative to the second sliding hole.

In the liquid crystal display device of the present invention, a screw structure is disposed at an inner side of the first sliding hole.

The liquid crystal display device further comprises a first bolt. The first bolt passes through the first through hole and is screwed to the screw structure at the inner side of the first sliding hole. Pressure between the first bolt and the screw structure at the inner side of the first sliding hole presses to fix the first sliding end.

In the liquid crystal display device of the present invention, a screw structure is disposed at an inner side of the second sliding hole.

The liquid crystal display device further comprises a second bolt. The second bolt passes through the second through hole and is screwed to the screw structure at the inner side of the second sliding hole. Pressure between the second bolt and the screw structure at the inner side of the second sliding hole presses to fix the first sliding end.

In the liquid crystal display device of the present invention, a recess is defined at the base, and the recess is utilized for containing the first connecting end and the second connecting end.

In the liquid crystal display device of the present invention, third connecting holes are defined at two sides of the recess, and the first connecting hole, the second connecting hole, and the third connecting holes are fixedly connected by the connecting post.

In the liquid crystal display device of the present invention, the supporting part is fixedly screwed to the liquid crystal display.

Another objective of the present invention is to provide a liquid crystal display device to solve the technical problem that the users cannot flexibly adjust the height of the liquid crystal display device since the supporting part and of the liquid crystal display device is fixedly connected with the base in the prior arts.

To solve the above-mentioned problem, the present invention provides a liquid crystal display device, which comprises a base, a supporting part, and a liquid crystal display. A sliding hole along a horizontal direction is defined at the supporting part.

The liquid crystal display device further comprises a first post and a second post. The first post and the second post are utilized for supporting the liquid crystal display. The first post comprises a first sliding end and a first connecting end, and the second post comprises a second sliding end and a second connecting end.

The first sliding end and the second sliding end slide to connect with the sliding hole. The first post and the second post are screw-connected by the first connecting end and the second connecting end, and the first post and the second post are screw-connected with the base.

The first post and the second post control a distance between the liquid crystal display and the base by rotating inwardly or outwardly.

In the liquid crystal display device of the present invention, the sliding hole comprises a first sliding hole and a second sliding hole which are disposed apart. The first sliding end comprises a first through hole, and the second sliding end comprises a second through hole.

The first sliding end slides to connect with the first sliding hole by the first through hole, and the second sliding end slides to connect with the second sliding hole by the second through hole.

In the liquid crystal display device of the present invention, a gear structure is disposed at an inner side of the first sliding hole.

The liquid crystal display device further comprises a first knob. The first knob comprises a first screw post, a first screw nut, a first helical gear, and a first controlling button which are connected. The first screw post passes through the first through hole and the first sliding hole and is screwed to the first screw nut.

The first helical gear is adaptive to be connected with the gear structure at the inner side of the first sliding hole, and the first controlling button is utilized for controlling the first screw post and the first helical gear to move along the horizontal direction, so as to control the first sliding end to slide relative to the first sliding hole.

In the liquid crystal display device of the present invention, a gear structure is disposed at an inner side of the second sliding hole.

The liquid crystal display device further comprises a second knob. The second knob comprises a second screw post, a second screw nut, a second helical gear, and a second controlling button. The second screw post passes through the second through hole and the second sliding hole and is screwed to the second screw nut.

The second helical gear is adaptive to be connected with the gear structure at the inner side of the second sliding hole. The second controlling button is utilized for controlling the second screw post and the second helical gear to move along the horizontal direction, so as to control the second sliding end to slide relative to the second sliding hole.

In the liquid crystal display device of the present invention, a screw structure is disposed at an inner side of the first sliding hole.

The liquid crystal display device further comprises a first bolt. The first bolt passes through the first through hole and is screwed to the screw structure at the inner side of the first sliding hole. Pressure between the first bolt and the screw structure at the inner side of the first sliding hole presses to fix the first sliding end.

In the liquid crystal display device of the present invention, a screw structure is disposed at an inner side of the second sliding hole.

The liquid crystal display device further comprises a second bolt. The second bolt passes through the second through hole and is screwed to the screw structure at the inner side of the second sliding hole. Pressure between the second bolt and the screw structure at the inner side of the second sliding hole presses to fix the first sliding end.

In the liquid crystal display device of the present invention, the first connecting end comprises a first connecting hole, and the second connecting end comprises a second connecting hole. The liquid crystal display device further comprises a connecting post, and the first connecting hole and the second connecting hole are fixedly connected by the connecting post.

In the liquid crystal display device of the present invention, a recess is defined at the base, and the recess is utilized for containing the first connecting end and the second connecting end.

In the liquid crystal display device of the present invention, third connecting holes are defined at two sides of the recess, and the first connecting hole, the second connecting hole, and the third connecting holes are fixedly connected by the connecting post.

In the liquid crystal display device of the present invention, the supporting part is fixedly screwed to the liquid crystal display.

Compared with the prior arts, the present invention solves the technical problem that the users cannot flexibly adjust the height of the liquid crystal display device since the supporting part and of the liquid crystal display device is fixedly connected with the base in the prior arts and thus experience feeling of the users is increased.

For a better understanding of the aforementioned content of the present invention, preferable embodiments are illustrated in accordance with the attached figures for further explanation:

DETAILED DESCRIPTION OF THE INVENTION

The following descriptions for the respective embodiments are specific embodiments capable of being implemented for illustrations of the present invention with referring to appended figures.

Figure 1:
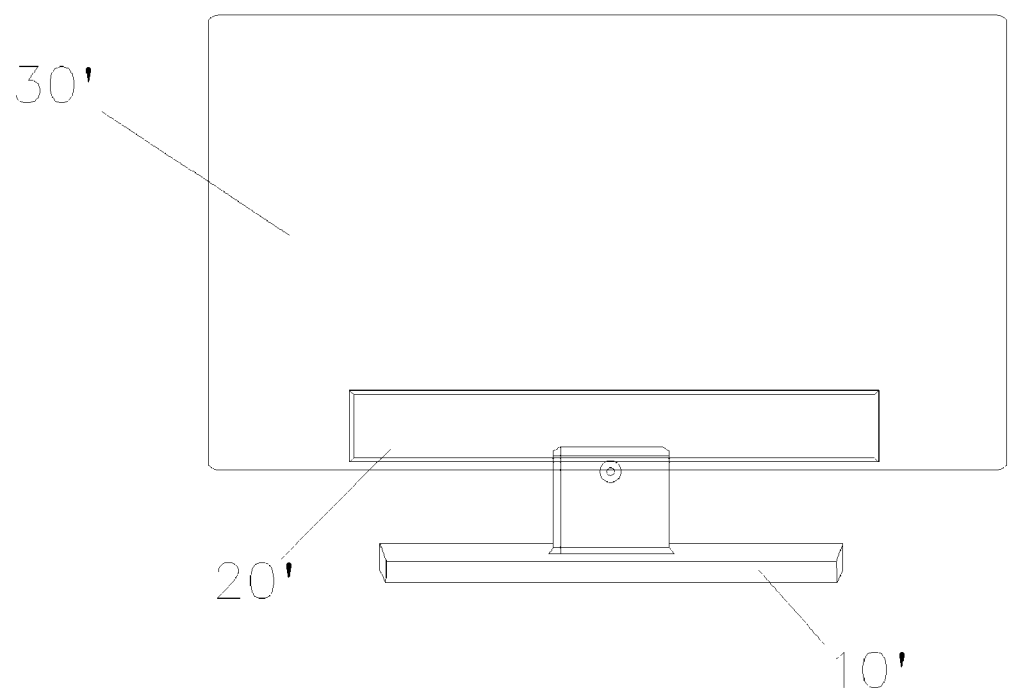
FIG. 1 shows a supporting method of a liquid crystal display in the prior arts.
Figure 2:
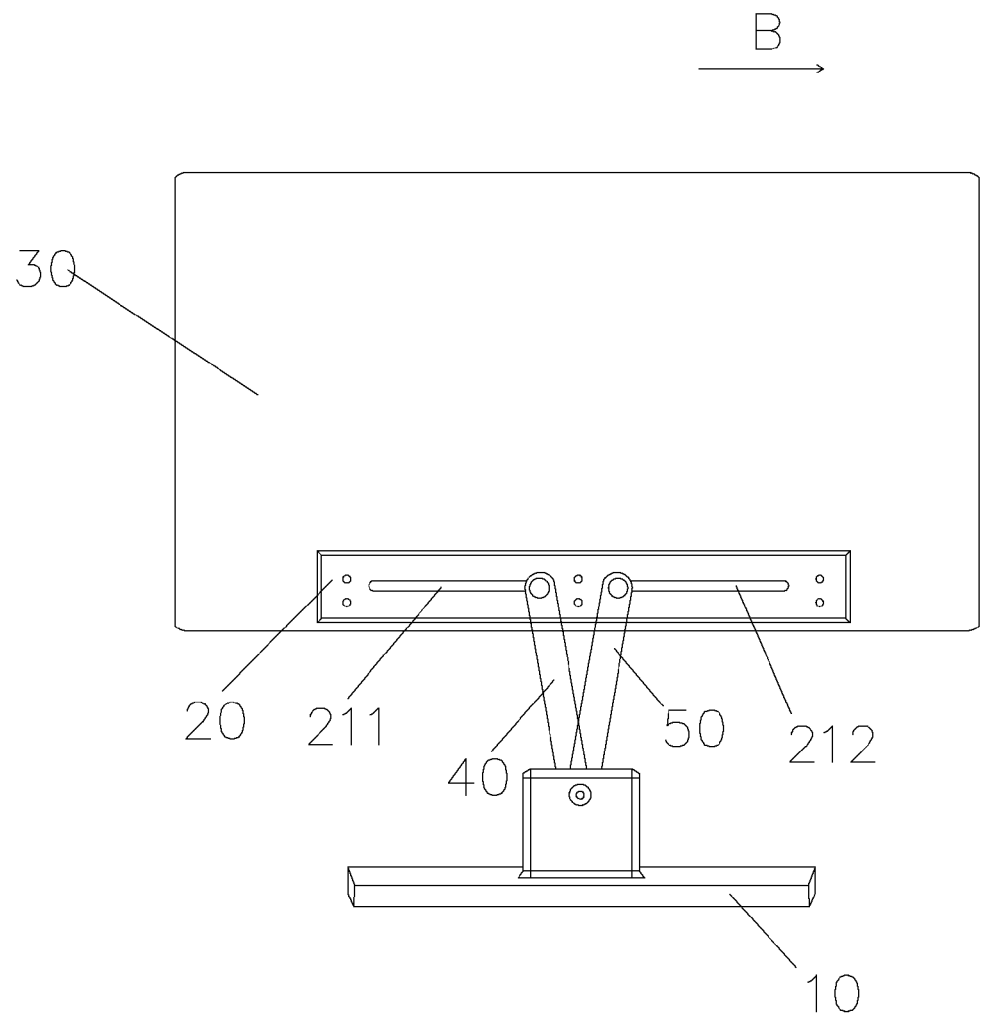
FIG. 2 shows a rear view of a preferable embodiment of a liquid crystal display device according to the present invention.

FIG. 2 shows a rear view of a preferable embodiment of a liquid crystal display device according to the present invention.

The liquid crystal display device comprises a base 10, a supporting part 20 and a liquid crystal display 30. The supporting part 20 is fixedly connected with the liquid crystal display 30. Preferredly, the supporting part 20 is fixedly screwed to the liquid crystal display 30. Specifically, screw holes (not shown) are disposed at the supporting part 20 and the liquid crystal display 30, and the supporting part 20 is fixedly connected with the liquid crystal display 30 by at least one screw. Since the screw method is known for one skilled in the arts, it is not described in detail herein.

A sliding hole along a horizontal direction B is defined at the supporting part 20. In the embodiment of FIG. 2, the sliding hole comprises a first sliding hole 211 and a second sliding hole 212 which are disposed apart. Certainly, in the embodiment implementing processes, the first sliding hole 211 and the second sliding hole 212 can be integrated as one and are not listed herein.

Figure 3:
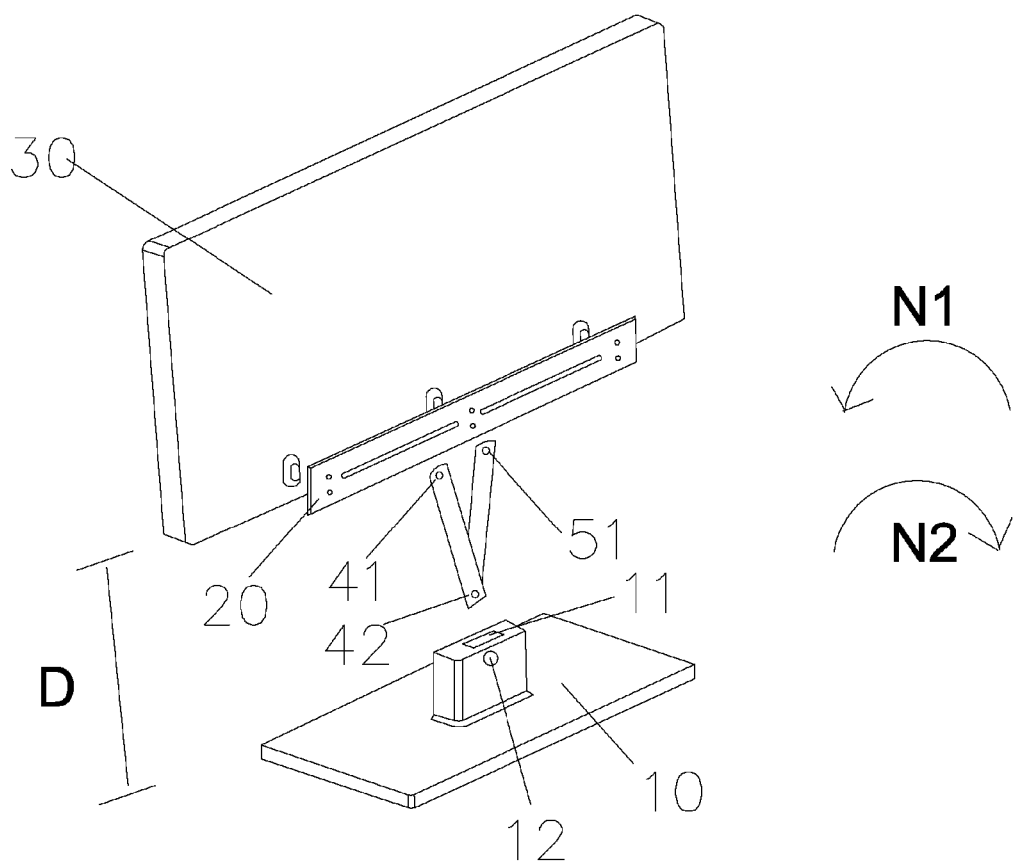
FIG. 3 shows a side view of a preferable embodiment of a liquid crystal display device according to the present invention.

Please refer to FIG. 2 and FIG. 3. The liquid crystal display device further comprises a first post 40 and a second post 50 which are disposed to cross with each other. The first post 40 comprises a first sliding end and a first connecting end. The first sliding end comprises a first through hole 41. The second post 50 comprises a second sliding end and a second connecting end. The second sliding end comprises a second through hole 51.

Please refer to FIG. 2 and FIG. 3. The first connecting end of the first post 40 comprises a first connecting hole 42, and the second connecting end of the second post 50 comprises a second connecting hole (not shown). The first connecting hole 42 and the second connecting hole are connected by a connecting post (not shown).

In the present embodiment, a recess 11 is defined at the base 10. The recess 11 contains the first connecting hole 42 of the first connecting end and the second connecting hole of the second connecting end.

Preferredly, the base 10 comprises third connecting holes 12. Specifically, the third connecting holes 12 are defined at two sides of the recess 11. The first connecting hole 42, the second connecting hole, and the third connecting holes are fixedly connected by the connecting post.

In the embodiment implementing processes, users can control a distance D between the liquid crystal display 30 and the base 10 by controlling the first post 40 and the second post 50 to rotate inwardly (N1) or outwardly (N2). When the first post 40 and the second post 50 are controlled to rotate inwardly (N1), this means that the first post 40 is controlled to rotate relative to the second post 50 in a counter clockwise manner. When the first post 40 and the second post 50 are controlled to rotate outwardly (N2), this means that the first post 40 is controlled to rotate relative to the second post 50 in a clockwise manner.

In the embodiment shown in FIG. 2 and FIG. 3, the first sliding end slides to connect with the first sliding hole 211 by the first through hole 41, and the second sliding end slides to connect with the second sliding hole 212 by the second through hole 51.

Figure 4:
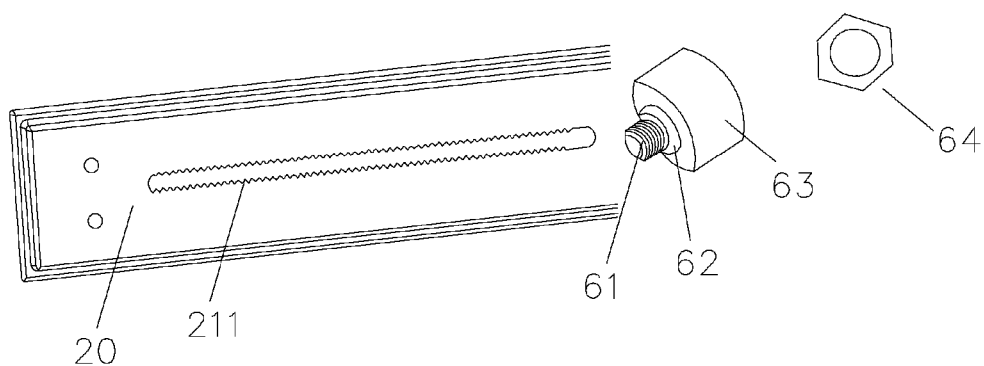
FIG. 4 shows that a first sliding hole is connected with a first sliding end in a first preferable embodiment according to the present invention.

As a first preferable embodiment according to the present invention, please refer to FIG. 4, which shows that the first sliding hole 211 is connected with the first sliding end, and the second sliding hole 212 and the second connecting end.

In the first preferable embodiment shown in FIG. 4, a gear structure is disposed at an inner side of the first sliding hole 211. The liquid crystal display device further comprises a first knob 60. The first knob 60 comprises a first screw post 61, a first screw nut 64, a first helical gear 62, and a first controlling button 63.

The first screw post 61 passes through the first through hole 41 and the first sliding hole 211 and then is screwed to the first screw nut 64. The first helical gear 62 is adaptive to be connected with the gear structure at the inner side of the first sliding hole 211. The first controlling button 63 is utilized for controlling the first screw post 61 and the first helical gear 62 to move along the horizontal direction B, so as to control the first sliding end to slide relative to the first sliding hole 211.

Likewise, a gear structure is disposed at an inner side of the second sliding hole 212. The liquid crystal display device further comprises a second knob having the same structure as the first knob 60. The second knob comprises a second screw post, a second screw nut, a second helical gear, and a second controlling button.

Similar to the manner in FIG. 4, the second screw post of the second knob passes through the second through hole 51 and the second sliding hole 212 and then is screwed to the second screw nut. The second helical gear is adaptive to be connected with the gear structure at the inner side of the second sliding hole 212. The second controlling button is utilized for controlling the second screw post and the second helical gear to move along the horizontal direction B, so as to control the second sliding end to slide relative to the second sliding hole 212.

Figure 5:
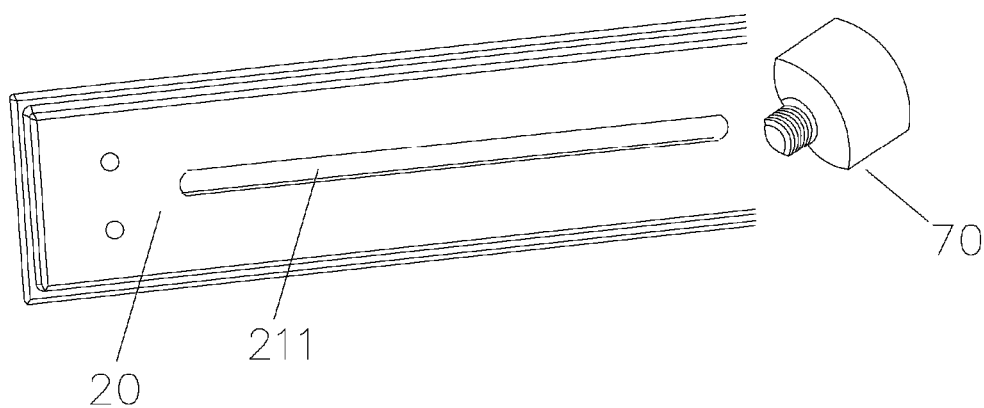
FIG. 5 shows that a first sliding hole is connected with a first sliding end in a second preferable embodiment according to the present invention.

As a second preferable embodiment according to the present invention, please refer to FIG. 5, which shows that the first sliding hole 211 is connected with the first sliding end, and the second sliding hole 212 and the second connecting end.

In the second preferable embodiment shown in FIG. 5, a screw structure (not shown) is disposed at an inner side of the first sliding hole 211. The liquid crystal display device further comprises a first bolt 70. The first bolt 70 passes through the first through hole 41 and is screwed to the screw structure at the inner side of the first sliding hole 211. Pressure between the first bolt 70 and the screw structure at the inner side of the first sliding hole 211 presses to fix the first sliding end.

Similar to the manner in FIG. 5, a screw structure (not shown) is disposed at an inner side of the second sliding hole 212. The liquid crystal display device further comprises a second bolt having the same structure as the first bolt. The second bolt passes through the second through hole 51 and is screwed to the screw structure at the inner side of the second sliding hole 212. Pressure between the second bolt and the screw structure at the inner side of the second sliding hole 212 presses to fix the second sliding end.

Operational principles of the preferable embodiment of the liquid crystal display device in FIG. 2 and FIG. 4 are described in the following.

When assembling, the supporting part 20 is fixed to the liquid crystal display 30 by a screw method.

Then, the first through hole 41 of the first sliding end slides to connect with the first sliding hole 211. Specifically, the first through hole 41 is aligned with the sliding hole 211, the first screw post 61 of the knob 60 passes through the first through hole 41 and the first sliding hole 211, and the first screw post 61 is screwed to the first nut (not shown), so that the first sliding end is connected with the supporting part 20 and the first helical gear 62 engages with the gear structure of the first sliding hole 211. Likewise, the second through hole 51 of the second sliding end slides to connect with the second sliding hole 212.

Finally, the first connecting hole 42 is aligned with the second connecting hole (not shown) and then they are inserted into the recess 11 of the base 10, and the first connecting hole 42 and the second connecting hole are aligned with the third connecting hole 12. The connecting post passes through the first connecting hole 42, the second connecting hole, and the third connecting hole 12, so that the first connecting hole, the second connecting hole, and the third connecting hole are screw-connected with one another.

When the users watch TV programs on liquid crystal display device of the preferable embodiment according to the present invention and the viewing height is required to be adjusted, the height D of the liquid crystal display device can be controlled by rotating the first controlling button 63 and the second controlling button to control the first post 40 and the second post 50 to rotate inwardly (N1) or outwardly (N2).

Operational principles of the preferable embodiment of the liquid crystal display device in FIG. 2 and FIG. 5 are described in the following.

When assembling, the first through hole 41 of the first sliding end is aligned with the first sliding hole 211, the first bolt 70 passes through the first through hole 41 and the first sliding hole 211, and the first bolt 70 is screwed to the gear structure at the inner side of the first sliding hole 211. Likewise, the second sliding end slides to connect the second sliding hole 212.

Finally, the first connecting hole 42 is aligned with the second connecting hole and then they are inserted to the recess 11 of the base 10, and the first connecting hole 42 and the second connecting hole are aligned with the third connecting hole 12. The connecting post passes through the first connecting hole 42, the second connecting hole, and the third connecting hole 12, so that the first connecting hole, the second connecting hole and the third connecting hole are screw-connected with one another.

When the users watch TV programs on liquid crystal display device of the preferable embodiment according to the present invention and the viewing height is required to be adjusted, the first bolt 70 is loosed relative to the sliding hole 211. Then, the first sliding hole slides to a position, and the first bolt 70 is tightly screwed relative to the first sliding hole 211. The pressure between the first bolt and the screw structure at the inner side of the first sliding hole 211 presses to fix the first sliding end. The adjusting processes of the second sliding end are similar to those of the first sliding end and not described in detail herein. By the above-mentioned method, the users can flexibly adjust the height D of the liquid crystal display 30.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A liquid crystal display device, comprising a base, a supporting part, and a liquid crystal display, the supporting part being fixedly connected with the liquid crystal display, characterized in that a sliding hole along a horizontal direction is defined at the supporting part, and the sliding hole comprises a first sliding hole and a second sliding hole which are disposed apart;

the liquid crystal display device further comprises a first post and a second post, the first post and the second post are utilized for supporting the liquid crystal display, the first post comprises a first sliding end and a first connecting end, and the second post comprises a second sliding end and a second connecting end;

the first sliding end comprises a first through hole, the second sliding end comprises a second through hole, the first sliding end slides to connect with the first sliding hole by the first through hole, and the second sliding end slides to connect with the second sliding hole by the second through hole;

the first connecting end comprises a first connecting hole, the second connecting end comprises a second connecting hole, and the liquid crystal display device further comprises a connecting post, the first connecting hole and the second connecting hole are connected by the connecting post, so that the first post and the second post are screw-connected, and the first post and the second post are further screw-connected with the base;

the first post and the second post control a distance between the liquid crystal display and the base by rotating inwardly or outwardly.

2. The liquid crystal display device of claim 1, characterized in that a gear structure is disposed at an inner side of the first sliding hole;

the liquid crystal display device further comprises a first knob, the first knob comprises a first screw post, a first screw nut, a first helical gear, and a first controlling button which are connected, and the first screw post passes through the first through hole and the first sliding hole and is screwed to the first screw nut;

the first helical gear is adaptive to be connected with the gear structure at the inner side of the first sliding hole, and the first controlling button is utilized for controlling the first screw post and the first helical gear to move along the horizontal direction, so as to control the first sliding end to slide relative to the first sliding hole.

3. The liquid crystal display device of claim 1, characterized in that a gear structure is disposed at an inner side of the second sliding hole;

the liquid crystal display device further comprises a second knob, the second knob comprises a second screw post, a second screw nut, a second helical gear, and a second controlling button, and the second screw post passes through the second through hole and the second sliding hole and is screwed to the second screw nut;

the second helical gear is adaptive to be connected with the gear structure at the inner side of the second sliding hole, and the second controlling button is utilized for controlling the second screw post and the second helical gear to move along the horizontal direction, so as to control the second sliding end to slide relative to the second sliding hole.

4. The liquid crystal display device of 1, characterized in that a screw structure is disposed at an inner side of the first sliding hole;

the liquid crystal display device further comprises a first bolt, the first bolt passes through the first through hole and is screwed to the screw structure at the inner side of the first sliding hole, and pressure between the first bolt and the screw structure at the inner side of the first sliding hole presses to fix the first sliding end.

5. The liquid crystal display device of claim 1, characterized in that a screw structure is disposed at an inner side of the second sliding hole;

the liquid crystal display device further comprises a second bolt, the second bolt passes through the second through hole and is screwed to the screw structure at the inner side of the second sliding hole, and pressure between the second bolt and the screw structure at the inner side of the second sliding hole presses to fix the first sliding end.

6. The liquid crystal display device of claim 1, characterized in that a recess is defined at the base, and the recess is utilized for containing the first connecting end and the second connecting end.

7. The liquid crystal display device of claim 6, characterized in that third connecting holes are defined at two sides of the recess, and the first connecting hole, the second connecting hole, and the third connecting holes are fixedly connected by the connecting post.

8. The liquid crystal display device of claim 1, characterized in that the supporting part is fixedly screwed to the liquid crystal display.

9. A liquid crystal display device, comprising a base, a supporting part, and a liquid crystal display, the supporting part being fixedly connected with the liquid crystal display, characterized in that a sliding hole along a horizontal direction is defined at the supporting part;

the liquid crystal display device further comprises a first post and a second post, the first post and the second post are utilized for supporting the liquid crystal display, the first post comprises a first sliding end and a first connecting end, and the second post comprises a second sliding end and a second connecting end;

the first sliding end and the second sliding end slide to connect with the sliding hole, the first post and the second post are screw-connected by the first connecting end and the second connecting end, and the first post and the second post are screw-connected with the base;

the first post and the second post control a distance between the liquid crystal display and the base by rotating inwardly or outwardly.

10. The liquid crystal display device of claim 9, characterized in that the sliding hole comprises a first sliding hole and a second sliding hole which are disposed apart, the first sliding end comprises a first through hole, and the second sliding end comprises a second through hole;

the first sliding end slides to connect with the first sliding hole by the first through hole, and the second sliding end slides to connect with the second sliding hole by the second through hole.

11. The liquid crystal display device of claim 10, characterized in that a gear structure is disposed at an inner side of the first sliding hole;

the liquid crystal display device further comprises a first knob, the first knob comprises a first screw post, a first screw nut, a first helical gear, and a first controlling button which are connected, and the first screw post passes through the first through hole and the first sliding hole and is screwed to the first screw nut;

the first helical gear is adaptive to be connected with the gear structure at the inner side of the first sliding hole, and the first controlling button is utilized for controlling the first screw post and the first helical gear to move along the horizontal direction, so as to control the first sliding end to slide relative to the first sliding hole.

12. The liquid crystal display device of claim 10, characterized in that a gear structure is disposed at an inner side of the second sliding hole;

the liquid crystal display device further comprises a second knob, the second knob comprises a second screw post, a second screw nut, a second helical gear, and a second controlling button, and the second screw post passes through the second through hole and the second sliding hole and is screwed to the second screw nut;

the second helical gear is adaptive to be connected with the gear structure at the inner side of the second sliding hole, and the second controlling button is utilized for controlling the second screw post and the second helical gear to move along the horizontal direction, so as to control the second sliding end to slide relative to the second sliding hole.

13. The liquid crystal display device of claim 10, characterized in that a screw structure is disposed at an inner side of the first sliding hole;

the liquid crystal display device further comprises a first bolt, the first bolt passes through the first through hole and is screwed to the screw structure at the inner side of the first sliding hole, and pressure between the first bolt and the screw structure at the inner side of the first sliding hole presses to fix the first sliding end.

14. The liquid crystal display device of claim 10, characterized in that a screw structure is disposed at an inner side of the second sliding hole;

the liquid crystal display device further comprises a second bolt, the second bolt passes through the second through hole and is screwed to the screw structure at the inner side of the second sliding hole, and pressure between the second bolt and the screw structure at the inner side of the second sliding hole presses to fix the first sliding end.

15. The liquid crystal display device of claim 9, characterized in that the first connecting end comprises a first connecting hole, the second connecting end comprises a second connecting hole, the liquid crystal display device further comprises a connecting post, and the first connecting hole and the second connecting hole are fixedly connected by the connecting post.

16. The liquid crystal display device of claim 15, characterized in that a recess is defined at the base, and the recess is utilized for containing the first connecting end and the second connecting end.

17. The liquid crystal display device of claim 16, characterized in that third connecting holes are defined at two sides of the recess, and the first connecting hole, the second connecting hole, and the third connecting holes are fixedly connected by the connecting post.

18. The liquid crystal display device of claim 9, characterized in that the supporting part is fixedly screwed to the liquid crystal display.

\* \* \* \* \*